US011125629B2

(12) United States Patent
Coimbra et al.

(10) Patent No.: US 11,125,629 B2
(45) Date of Patent: Sep. 21, 2021

(54) TEMPERATURE DETECTION CIRCUITRY

(71) Applicant: NXP USA, Inc., Austin, TX (US)

(72) Inventors: Ricardo Pureza Coimbra, Campinas (BR); Juan Camilo Monsalve, Campinas (BR)

(73) Assignee: NXP USA, INC., Austin, TX (US)

( * ) Notice: Subject to any disclaimer, the term of this patent is extended or adjusted under 35 U.S.C. 154(b) by 399 days.

(21) Appl. No.: 16/209,603

(22) Filed: Dec. 4, 2018

(65) Prior Publication Data
US 2020/0173862 A1   Jun. 4, 2020

(51) Int. Cl.
*G01K 7/01*  (2006.01)
*G05F 3/26*  (2006.01)

(52) U.S. Cl.
CPC ............. *G01K 7/01* (2013.01); *G05F 3/267* (2013.01)

(58) Field of Classification Search
USPC ......... 374/170, 171, 173, 178, 141; 327/512
See application file for complete search history.

(56) References Cited

U.S. PATENT DOCUMENTS

| 5,063,342 | A | 11/1991 | Hughes et al. | |
|---|---|---|---|---|
| 5,325,045 | A | 6/1994 | Sundby | |
| 6,674,185 | B2 | 1/2004 | Mizuta | |
| 7,724,068 | B1 * | 5/2010 | Smith | G01K 3/005 |
| | | | | 327/513 |
| 7,880,528 | B2 | 2/2011 | Igarashi | |
| 8,400,213 | B2 | 3/2013 | Sicard | |
| 8,915,646 | B2 * | 12/2014 | Wei | G01K 7/34 |
| | | | | 374/178 |
| 9,110,485 | B2 | 8/2015 | Sicard | |
| 2005/0099752 | A1 * | 5/2005 | Liepold | G01K 17/06 |
| | | | | 361/103 |
| 2005/0220171 | A1 * | 10/2005 | Faour | G01K 7/01 |
| | | | | 374/178 |
| 2007/0146047 | A1 * | 6/2007 | Senriuchi | G01D 3/036 |
| | | | | 327/512 |
| 2009/0295458 | A1 * | 12/2009 | Kameyama | G05F 3/227 |
| | | | | 327/512 |
| 2011/0001546 | A1 | 1/2011 | Guo et al. | |
| 2013/0241523 | A1 | 9/2013 | Youssefi | |
| 2017/0307451 | A1 * | 10/2017 | Goumballa | G01K 7/16 |
| 2019/0204164 | A1 * | 7/2019 | Coimbra | G01K 1/14 |

OTHER PUBLICATIONS

U.S. Appl. No. 16/209,523,"Bandgap Reference Voltage Circuitry," filed Dec. 4, 2018, 34 pages.
Notice of Allowance for U.S. Appl. No. 16/209,523 dated Jul. 25, 2019, 17 pages.

* cited by examiner

*Primary Examiner* — Mirellys Jagan

(57) ABSTRACT

An embodiment for an integrated circuit for temperature detection includes: a closed loop circuit branch including: a first bipolar junction transistor (BJT), a first resistor coupled between a first base of the first BJT and a junction node, and an amplifier having an output coupled to the junction node and a non-inverting input coupled to a collector of the first BJT; and an open loop circuit branch including: a second BJT, a second resistor coupled between a base of the second BJT and the junction node, a third resistor coupled between the base of the second BJT and ground, and a comparator having an inverting input coupled to a collector of the second BJT and an output configured to provide a digital voltage signal that corresponds to a temperature reading.

20 Claims, 7 Drawing Sheets

TEMPERATURE DETECTION CIRCUITRY

BACKGROUND

Field

This disclosure relates generally to temperature detection circuitry, and more specifically, to improved accuracy in temperature detection circuitry.

Related Art

Thermal performance has become an increasingly important characteristic of integrated circuits (ICs), which may behave differently at different temperatures. For example, as the temperature of a circuit changes, the electrical characteristics of the circuit also changes, including threshold voltage level, electron mobility, wiring or contact resistance, and the like. Internally generated voltages used by various subsystems in an IC may be sensitive to temperature changes in a way that compromises performance. In some situations, an accurate temperature detector is necessary to detect when a circuit is operating outside of normal or safe operating conditions.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

Figure 1:
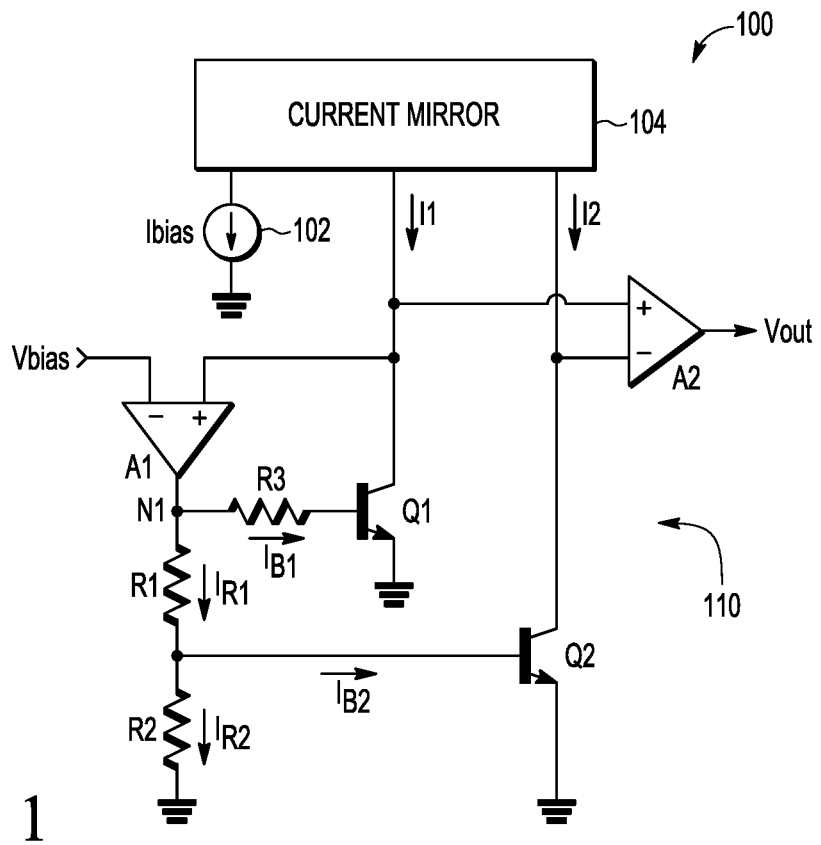
FIGS. 1, 2, and 3 illustrate block diagrams depicting various examples of temperature detection circuitry, according to some embodiments of the present disclosure.

The following sets forth a detailed description of various embodiments intended to be illustrative of the invention and should not be taken to be limiting.

Overview

Temperature detector circuits are extensively used in products such as microcontroller systems that include an integrated circuit or die. Generally, temperature detector circuits are used to determine whether the die is operating within a safe operating temperature range. Microcontroller systems often include an integrated temperature detector circuit to monitor the die temperature and detect whether the die temperature exceeds a threshold temperature. In one example, an automotive microcontroller system may follow stringent automotive safety standards that often require the automotive microcontroller system to counteract a temperature excursion above the safe operating temperature range, such as by adjusting power dissipation. As another example, a microcontroller system may follow security standards that require the microcontroller system to restrict access and functionality when the die temperature exceeds the threshold temperature, which may cause incorrect operation or corruption of the die or other components of the system (e.g., the microcontroller system may erase sensitive information before the system memory fails).

Conventional approaches to temperature detection circuits tend to consume significant amounts of silicon area and typically require part-to-part calibration, often at more than one temperature, to achieve the accuracy required. However, low area usage is desirable to minimize total cost of the product, especially when numerous temperature detectors are needed (e.g., to monitor various die locations, for redundancy, and the like). A minimum testing time is also desirable, where the testing time is normally a function of the calibration procedure and number of test temperature insertions and may often dominate the final cost of the product. Finally, it is desirable that threshold temperature detection is precise and does not over-limit a defined operational temperature range.

The present disclosure described herein provides temperature detection circuitry integrated on a die that utilizes a compact circuit arrangement with low area cost and provides accurate temperature detection even without calibration. However, a single-temperature calibration (e.g., at room temperature) may be employed to achieve even higher accuracy. The temperature detection circuitry utilizes bipolar junction transistors (BJTs) to accurately detect when die temperature crosses a threshold temperature, which is programmable based on a resistance ratio implemented in the temperature detection circuitry. The temperature detection circuitry is configured to output a digital detection signal (e.g., a binary signal or a flag) whose logical state indicates whether die temperature is above or below the programmed threshold temperature. The resistance ratio may be implemented by a resistor divider, part of which may be implemented using a network of switches and resistors, which may be controlled by a finite state machine, in some embodiments. For example, in some embodiments, the temperature detection circuitry may be implemented in a digital temperature sensor, where the finite state machine is configured to sequentially set different resistive values (e.g., through a binary search approach) and check the detection signal to determine a threshold temperature interval that includes the actual die temperature and to output an M-bit value corresponding to the interval of threshold temperatures.

The temperature detection circuitry may also include current-providing circuitry for providing one or more bias currents, one or more bias voltages, or both, to components of the temperature detection circuitry. In some embodiments, the temperature detection circuitry may be implemented as part of a system-on-chip (SoC), where the current-providing circuitry couples components of the temperature detection circuitry (such as the BJTs) to one or more dedicated current generators or one or more dedicated voltage sources on the SoC. If the dedicated current generators or dedicated voltage sources on the SoC are not accurate enough, the current-providing circuitry may also implement self-biasing capabilities that generate accurate and well-controlled bias currents or bias voltages for use by the temperature detection circuitry. For example, a first current and a second current are respectively provided to a first BJT and a second BJT of the temperature detection circuitry, where the first and second currents are generally provided according to a known ratio between two integer numbers, which may result in an integer N ratio (e.g., N:1) or N may be a fractional ratio. In some embodiments, current-providing circuitry may include circuit components to generate bias currents or bias voltages that are well-controlled to a desired ratio in an accurate and stable manner, rather than relying on dedicated current generators or voltage sources that may not provide the necessary accuracy or stability required by the temperature detection circuitry in some applications.

The temperature detection circuitry also minimizes sensitivity to various error sources, such as BJT base current effects (e.g., mismatch in current gain $\beta$) and MOSFET (metal-oxide-semiconductor field-effect-transistor) device mismatch, where MOSFETs may be used within the temperature detection circuitry to implement stages for an amplifier or a comparator device. Based on the configuration of the temperature detection circuitry, the sensitivity to MOSFET mismatch is greatly attenuated and small sized MOSFETs may be used, which aid in a compact arrangement with low area cost.

For applications that require higher accuracy, single temperature calibration may be performed to adjust the threshold temperature to the required accuracy, considering tester limitations to accurately determine the test temperature itself. The single temperature calibration need not be formed at the threshold temperature (e.g., −40° C., 125° C.), but instead at any known temperature, such as at or near room temperature, at a designated "cold" temperature (e.g., between −40° C. and room temperature), or at a designated "hot" temperature (e.g., between room temperature and 125° C.). The calibration of the threshold temperature is also controlled by adjusting a programmable resistor of the resistor divider, which may be controlled by a finite state machine, in some embodiments.

Example Embodiments

Figure 2:
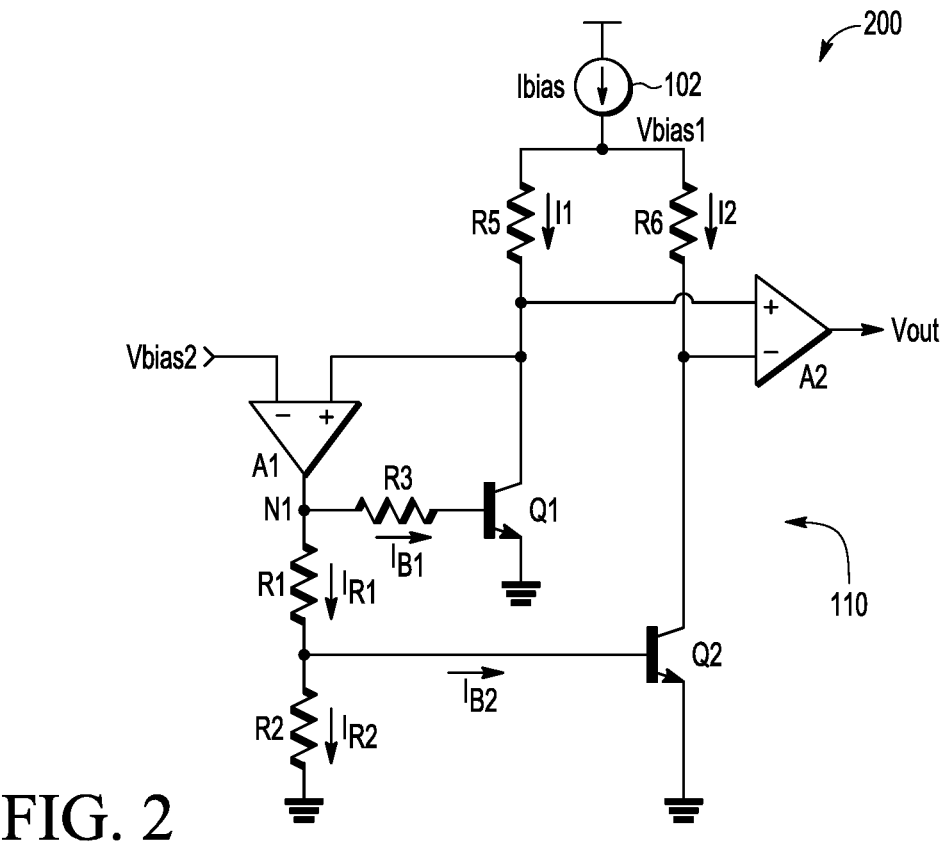
Figure 3:
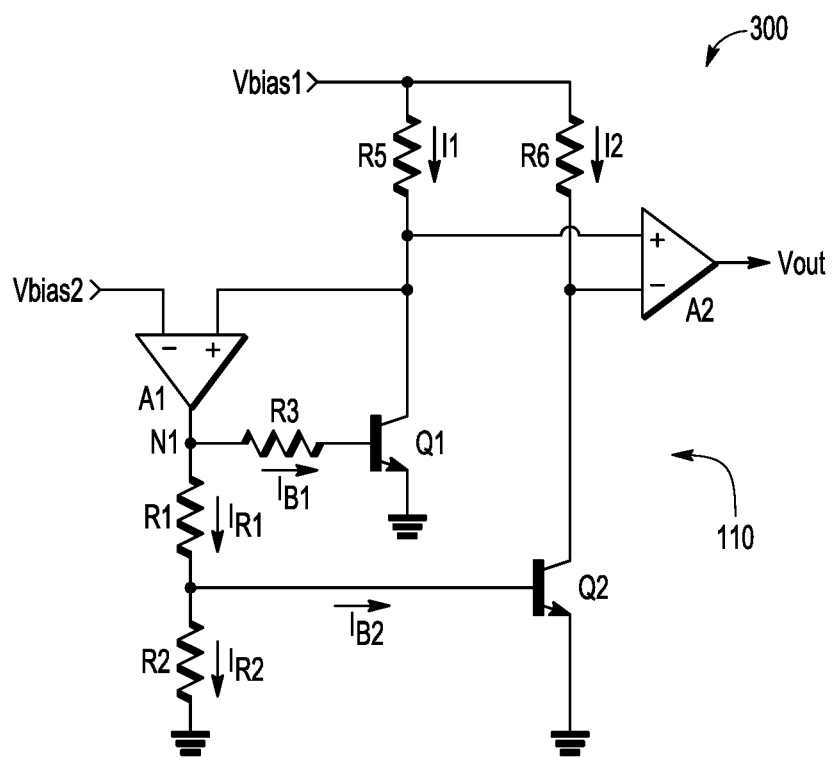

FIGS. 1, 2, and 3 each show a respective example of temperature detection circuitry that may be implemented as an integrated circuit. An integrated circuit and any circuitry described herein may be implemented in a semiconductor substrate, which can be any semiconductor material or combinations of materials, such as gallium arsenide, silicon germanium, silicon-on-insulator (SOI), silicon, monocrystalline silicon, the like, and combinations of the above. Each bottom portion of FIGS. 1, 2, and 3 illustrates a similar circuitry arrangement 110, while each top portion of FIGS. 1, 2, and 3 illustrates a different example of current-providing circuitry, as further discussed below. In some embodiments, the components of circuitry arrangement 110 are formed in a same substrate as the circuit(s) whose temperature is being monitored by the temperature detection circuitry. The temperature of the substrate is understood to be uniform (or substantially uniform) at both the temperature detection circuitry and the circuitry being monitored by the temperature detection circuitry.

FIG. 1 shows temperature detection circuitry 100 that includes circuitry arrangement 110, components of which include two bipolar junction transistors (BJTs) Q1 and Q2, three resistors R1, R2, and R3, an amplifier A1, and a comparator A2. The circuitry arrangement 110 implements a closed loop circuit branch that includes amplifier A1 and an open loop circuit branch that includes comparator A2. The amplifier A1 and the comparator A2 may each be implemented using an operational amplifier (op amp) or other suitable circuitry (e.g., one or more stages implemented using a number of MOSFETs). An op amp generally operates as an amplifier (e.g., amplifies an input signal) when connected in a closed loop (e.g., receives feedback), and generally operates as a comparator (e.g., compares two input signals) when connected in an open loop (e.g., does not receive feedback).

The circuitry arrangement 110 also includes a bipolar junction transistor (BJT) in each circuit branch, labeled as Q1 in the closed loop circuit branch and Q2 in the open loop circuit branch. In the embodiment shown, Q1 and Q2 are NPN BJTs, but other types of suitable transistors may be utilized in other embodiments (e.g., PNP BJTs). Q1 and Q2 each have three terminals that correspond to the NPN doped regions formed in the substrate, which respectively are collector (C) terminal, base (B) terminal, and emitter (E) terminal. The base terminal acts as the control terminal of a BJT, while the collector and emitter terminals act as current terminals (where the emitter is identified by the outward pointing arrow), also respectively referred to herein as simply a base, a collector, and an emitter of a BJT. Q1 and Q2 are implemented with proportional B-E junction areas, where each are generally implemented by associating a number of unit BJT devices (e.g., one or more) in parallel, where the associated BJTs have same sized B-E junction areas and same sized B-C junction areas, and the number of unit BJT devices implemented in Q1 and Q2 need not be equal. However, because of process spread or fabrication abnormalities during formation of the BJT devices (e.g., unequal dopant concentration, unequal thickness of semiconductor layers, and the like), the BJT devices may have slightly different current gains $\beta$ (beta) from part to part, which may affect the accuracy of the temperature detection circuitry 100. The present disclosure provides that circuitry arrangement 110 is configured to cancel out sensitivity to current gain $\beta$ (relying on the generally good matching that exists between Q1 and Q2 beta values), which improves accuracy of the temperature detection circuitry, even without calibration. Current gain $\beta$ cancellation is further discussed below.

In typical operation, Q1 and Q2 each have a respective collector voltage Vc, base voltage Vb, and emitter voltage Ve, where base-emitter voltage Vbe is the voltage drop measured across the base and emitter of the respective BJT, and collector-emitter voltage Vce is the voltage drop measured across the collector and emitter of the respective BJT. Q1 and Q2 begin conducting current when the respective Vbe is equal to or greater than a turn-on voltage of about 0.7V, where Q1 and Q2 conduct a collector current Ic, a base current Ib, and an emitter current Ie, where Ie=Ib+Ic. Q1 and Q2 may operate in saturation mode when the B-E junction and the B-C junction are both forward biased and Vce is approximately near 0V, in active mode when the B-E junction is forward biased and the B-C junction is reverse biased and Vce is greater than Vbe, or in cut-off mode when Vbe is less than the turn-on voltage and little to no current (e.g., leakage currents being non-zero) being conducted. Generally for a given base current Ib, Ic<$\beta$·Ib in saturation mode, reaching a maximum value $Ic=\beta \cdot Ib$ in active mode. A BJT may be operated as a switch, generally being controlled in saturation mode (e.g., "on") or cut-off mode (e.g., "off"). The BJT saturation voltage VceSat is the voltage drop measured across the collector and emitter of a BJT at the point where a further increase in base current Ib or voltage Vb does not result in a corresponding increase in collector current Ic. Ideally, VceSat is 0V, but practically, VceSat is considered to be 0.1V or 0.2V. Characteristics of the BJTs are temperature dependent, where current and voltage of the BJT may vary as temperature varies. For example, collector current Ic depends on the reverse saturation current Ico and base-emitter voltage Vbe. As temperature increases, the reverse saturation current Ico increases (due to more electron-hole pairs being thermally generated), which increases Ic. To maintain constant current Ic at changing temperatures, Vbe may be decreased by approximately 2 mV per 1° C. increase in temperature, and similarly increased by approximately 2 mV per 1° C. decrease in temperature.

The collector of Q1 is coupled to receive a first current I1 and the collector of Q2 is coupled to receive a second current I2, which may be provided by current-providing circuitry from one or more dedicated current generators available to temperature detection circuitry 100 (e.g., on a system-on-chip, integrated circuit, microcontroller system, and the like). Generally, currents I1 and I2 are provided at a known ratio, which may be a ratio between two integer numbers. In some embodiments, the temperature detection circuitry may be implemented as part of a system-on-chip (SoC). The SoC may include dedicated current generators or voltage sources (e.g., current generators configured to source or sink current, positive supply voltage rails like Vdd, and negative supply voltage rails like ground or Vss) that are well-controlled (e.g., current or voltage signals that are accurate to a known level and stable at that level over time), where well-controlled current generators may be used to successfully provide currents I1 and I2 at the known ratio. In such embodiments, the temperature detection circuitry includes current-providing circuitry, which couples or provides the well-controlled current or voltage signals to inputs of components in the temperature detection circuitry. In other embodiments, the SoC may include only one well-controlled current generator or voltage source, or the SoC may include current generators or voltage sources that are not well-controlled (e.g., not stable or not within the accuracy needed). In such embodiments, temperature detection circuitry includes current-providing circuitry configured to implement self-biasing capabilities to generate the necessary signals for temperature detection circuitry. For example, current-providing circuitry may be configured to generate well-controlled currents I1 and I2 at the known ratio based on one or more of the SoC's dedicated current or voltage sources, which may or may not be well-controlled. The self-biasing capability of temperature detection circuitry is also beneficial for applications where improved accuracy is required. Various examples of current-providing circuitry for providing or generating the first and second currents I1 and I2 are further discussed below.

The closed loop circuit branch includes amplifier A1, BJT Q1, and resistor R3. Amplifier A1 has an output coupled to a junction node N1. Resistor R3 is coupled between junction node N1 and the base of Q1 (e.g., a first terminal of R3 is coupled to node N1 and a second terminal of R3 is coupled to the base of Q1). The emitter of Q1 is coupled to ground or other negative supply voltage (e.g., Vss or the like). Amplifier A1 has an inverting input (identified by the minus sign) coupled to a bias voltage (Vbias). Bias voltage Vbias may be set at any convenient level equal to or above BJT saturation voltage VceSat (e.g., Vbias may be set to a value or level in the range of 0.1V to 0.3V). The collector of Q1 is coupled to a non-inverting input (identified by the plus sign) of amplifier A1. Due to force of feedback, amplifier A1 produces an output node voltage that is coupled to junction node N1 that drives the base voltage of Q1 to bias Q1 to operate at a point where Q1's collector voltage Vc (or Vce since Q1's emitter is grounded) is equal to Vbias. At this bias point, Q1 also conducts collector current Ic equal to current I1 (e.g., Q1 operates in active region).

The open loop circuit branch includes comparator A2, BJT Q2, and resistors R1 and R2. The open loop circuit branch is coupled to the closed loop circuit branch at junction node N1. Resistor R1 is coupled between junction node N1 and the base of Q2 (e.g., a first terminal of R1 is coupled to node N1 and a second terminal of R1 is coupled to the base of Q2). Resistor R1 is also series-connected to resistor R2, which in turn is coupled to ground or other negative supply voltage (e.g., a first terminal of R2 is coupled to both the base of Q2 and the second terminal of R1, and a second terminal of R2 is coupled to ground). The emitter of Q2 is coupled to ground or other negative supply voltage. The collector of Q2 is coupled to an inverting (−) input of comparator A2. Comparator A2 also has a non-inverting (+) input coupled to a second bias voltage, which in this embodiment is provided by coupling the non-inverting (+) input of A2 to the collector of Q1, which shorts the non-inverting (+) input of A2 to the non-inverting (+) input of A1. However, in other embodiments, the non-inverting (+) input of comparator A2 may instead be coupled to the bias voltage Vbias at the inverting (−) input of A1, since A1's input voltages at its inverting (−) and non-inverting (+) inputs match (e.g., both are equal to Vbias). Comparator A2 is configured to compare Q2's collector voltage with Vbias and output a digital voltage signal Vout that corresponds to a temperature reading, as further discussed below.

Other currents present in circuitry arrangement 110 are also labeled, including the respective currents through resistors R1 and R2 labeled as IR1 and IR2, where base current IB1 passes through R3 when Q1 is turned on. It is noted that resistor R3 is included in the circuitry 100 to compensate for base current effects, as further discussed below. Ignoring R3 for the moment and instead having the base of Q1 connected to junction node N1, the circuitry arrangement 110 described herein provides that the voltage at Q1's base (or VBE1) is divided by the resistor divider formed by R1 and R2 to bias the base of Q2 with a portion of the Q1 base voltage. This fractional voltage defines an operating point for Q2 that corresponds to the threshold temperature that needs to be monitored or detected, where Q2 acts as a switch that is "on" when the substrate temperature is greater than the threshold temperature, or "off" when the substrate temperature is less than the threshold temperature.

Comparator A2 is configured to output a digital voltage signal Vout that indicates whether a present substrate temperature has crossed a threshold temperature (also referred to as a threshold temperature for detection) by comparing Q2's collector voltage with Vbias. As noted above, Vbias is set at a voltage level greater than VceSat. When the present substrate temperature is less than threshold temperature Ttsh, Q2 is "off" and sinks collector current Ic less than current I2. As a result, Q2's collector voltage is "pulled up" to a value above Vbias (e.g., the current source providing I2 pulls up the collector voltage to a positive supply voltage, such as Vdd), causing comparator A2 to output a logic LOW signal (e.g., logic 0, which may be ground or other negative supply voltage such as Vss). When the present substrate temperature is greater than threshold temperature Ttsh, Q2 is "on" and sinks collector current Ic equal to or greater than current I2. As a result, Q2 "pulls down" its collector voltage to a value below Vbias (e.g., pulls down using a negative supply voltage, such as ground), causing comparator A2 to output a logic HIGH signal (e.g., logic 1, which may be a positive supply voltage such as Vdd).

According to Kirchhoff's laws, a relationship between the circuit paths as viewed from node N1 through Q1 to ground and through Q2 to ground is described in Equation 1, which is used to determine current IR1 in Equation 2:

$$R_3 I_{B1} + V_{BE1} = R_1 I_{R1} + V_{BE2} \qquad \text{Eq. 1}$$

$$\Rightarrow I_{R1} = \frac{\Delta V_{BE}}{R_1} + \frac{R_3}{R_1} I_{B1} \qquad \text{Eq. 2}$$

where $\Delta VBE = VBE1 - VBE2$.

Similarly, a relationship between the circuit paths as viewed from the node at the base of Q2 through Q2 to ground and through R2 to ground is described in Equation 3. The relationship between currents viewed from the node at the base of Q2 are described in Equation 4, which is used to determine IR2 and substituted into Equation 3 in order to determine VBE2 in Equation 5:

$$V_{BE2} = R_2 I_{R2} \qquad \text{Eq. 3}$$

$$I_{R1} = I_{R2} + I_{B2} \qquad \text{Eq. 4}$$

$$V_{BE2} = R_2 (I_{R1} - I_{B2}) \qquad \text{Eq. 5}$$

Using equations 2 and 5, the voltage applied to the base of Q2 may be written as Equation 6:

$$V_{BE2} = \frac{R_2}{R_1} \Delta V_{BE} + R_2 \left( \frac{R_3}{R_1} I_{B1} - I_{B2} \right) \qquad \text{Eq. 6}$$

At the exact threshold temperature Ttsh, VBE2 given by Equation 6 becomes equal to value VBE2(I2, Ttsh) which corresponds to Q2's base-emitter voltage VBE2 when Q2 conducts collector current equal to current I2 with collector voltage equal to Vbias. As noted above, Q1 conducts collector current equal to current I1. The classical equations that model BJT behavior are provided as Equation 7:

$$V_{BE} = \frac{kT}{q} \ln\left(\frac{I_c}{I_s}\right); \beta = \frac{I_C}{I_B}; I_s \propto A_E \qquad \text{Eq. 7}$$

where k is the Boltzmann constant,
q is the elementary charge on an electron,
T is the temperature in Kelvin,
Ic is the collector current,
Is is the saturation current, and
Ae is the emitter area.

Using the classical equations in Equation 7, the voltage difference ΔVBE at threshold temperature Ttsh is calculated as Equation 8:

$$V_{BE1\_Ttsh} - V_{BE2\_Ttsh} = V_{BE\_Ttsh} = \frac{kT_{tsh}}{q} \ln\left(\frac{I_1}{I_2} \frac{A_{E2}}{A_{E1}}\right) \qquad \text{Eq. 8}$$

Using Equation 8 for ΔVBE_Ttsh and using Ib=Ic/β in Equation 7, Equation 6 for VBE2 at threshold temperature Ttsh can be rewritten as Equation 9:

$$V_{BE2\_Ttsh} = V_{BE2}(I_2, T_{tsh}) = \left(\frac{R_2}{R_1}\right)\left(\frac{kT_{tsh}}{q}\right) \ln\left(\frac{I_1}{I_2} \frac{A_{E2}}{A_{E1}}\right) + R_2\left(\left(\frac{R_3}{R_1}\right)\left(\frac{I_1}{\beta_1}\right) - \frac{I_2}{\beta_2}\right) \qquad \text{Eq. 9}$$

where Ttsh is the threshold temperature in Kelvin,
I1 is the collector current Ic of Q1,
I2 is the collector current Ic of Q2,
Ae1 is the emitter area of Q1, and
Ae2 is the emitter area of Q2.

In order to cancel out the dependence of VBE2_Ttsh on current gain β, currents I1 and I2 are chosen in a range of Ic where β is stable (e.g., β1=β2=β), and current gain β is cancelled out of Equation 9 by making R3=R1(I2/I1), rewritten as Equation 10:

$$V_{BE2\_Ttsh} = V_{BE2}(I_2, T_{tsh}) = \left(\frac{R_2}{R_1}\right)\left(\frac{kT_{tsh}}{q}\right) \ln\left(\frac{I_1}{I_2} \frac{A_{E2}}{A_{E1}}\right) \qquad \text{Eq. 10}$$

or more simply as Equation 11:

$$V_{BE2\_Ttsh} = V_{BE2}(I_2, T_{tsh}) = \left(\frac{R_2}{R_1}\right) \Delta V_{BE\_Ttsh} \qquad \text{Eq. 11}$$

And the threshold temperature can be expressed as Equation 12:

$$T_{tsh} = V_{BE2}(I_2, T_{tsh}) \cdot \left(\frac{R_1}{R_2}\right) \cdot \left(\frac{q}{k}\right) \cdot \left(\frac{1}{\ln\left(\frac{I_1}{I_2} \frac{A_{E2}}{A_{E1}}\right)}\right) \qquad \text{Eq. 12}$$

It can be seen in Equation 11 that the circuitry arrangement 110 described herein compares VBE2(I2) (which is VBE2 when Q2 conducts collector current equal to I2) with ΔVBE times a ratio of R2 to R1 (or (R2/R1)·ΔVBE). VBE2(I2) has a negative thermal coefficient (e.g., VBE typically changes at a rate approximately −2 mV/° C. in silicon) and (R2/R1)·ΔVBE has a positive thermal coefficient adjusted appropriately through the gain term (R2/R1), where the circuitry arrangement 110 generates VBE2 nearly as a fraction of VBE1 based on the R2/R1 ratio. As a non-limiting example, assuming that Q2 conducts a constant collector current Ic equal to I2, Q2 may turn on with VBE2 equal to 0.7V at or near room temperature (e.g., 25° C.). As temperature increases, Q2 needs a smaller VBE2 to turn on while conducting the constant collector current Ic equal to I2, such as VBE2 equal to 0.5V at a threshold temperature Ttsh of 125° C. (e.g., −200 mV for 100° C. increase). Q2's base may be biased with the appropriate turn-on voltage that corresponds to the desired threshold temperature Ttsh for detection, where Q2 is turned "on" by VBE2 equal to the turn-on voltage when the substrate temperature equals or is greater than the threshold temperature. The appropriate Q2 base bias voltage for the desired threshold temperature Ttsh for detection may be selected by controlling the resistive value of R2 in the resistor divider, as further discussed below in connection with FIG. 8. The resistive value of R2 may similarly be used to trim or fine-tune the Q2 base bias voltage for improved calibration of temperature detection circuitry, also further discussed below in connection with FIG. 8. A programmable resistor may be used as R2 in all embodiments discussed herein, which has a configurable resistive value that may be selected from a number of available resistive values, such as in an array of resistors.

It is noted that the variations of the temperature detection circuitry discussed herein may be implemented as part of a digital temperature sensor with an M-bit digital output (M being an integer greater than 1) having a finite state machine (FSM) sequentially set different resistive values to identify the actual die temperature. For example, the FSM may implement a binary search approach or half-interval approach used to set a resistive value at R2, and then check the output of A2 to determine whether the threshold temperature corresponding to the resistive value of R2 has been crossed. Depending on whether the threshold temperature has been crossed, the binary search approach selects another resistive value for R2 and checks A2's output again. For example, the initial resistive value may correspond to a threshold temperature in the middle of the circuit's detectable range of temperatures. If A2's output indicates the threshold has not been crossed, the FSM selects the resistive value that corresponds to a threshold temperature in the middle of the remaining upper range of temperatures. Alternatively, if A2's output indicates the threshold has been crossed, the FSM selects the resistive value that corresponds to a threshold temperature in the middle of the remaining lower range of temperatures. This process continues until the actual die temperature is determined, which may be located between a pair of threshold temperatures that enclose the actual die temperature. For example, when a first resistive value corresponding to a given threshold temperature is selected, the comparator A2 outputs a logic low signal, and when a second resistive value corresponding to a next step in temperature is selected, the comparator A2 outputs a logic high signal. From this information, the FSM may determine that the actual die temperature is between the temperature interval corresponding to the first and second resistive values. The FSM may then output the M-bit digital value that corresponds to the interval, such as outputting the digital value that corresponds to the lower temperature value of the interval. The resolution of the temperature steps is further discussed in connection with the FSM of trim control 802 in FIG. 8.

Figure 4:
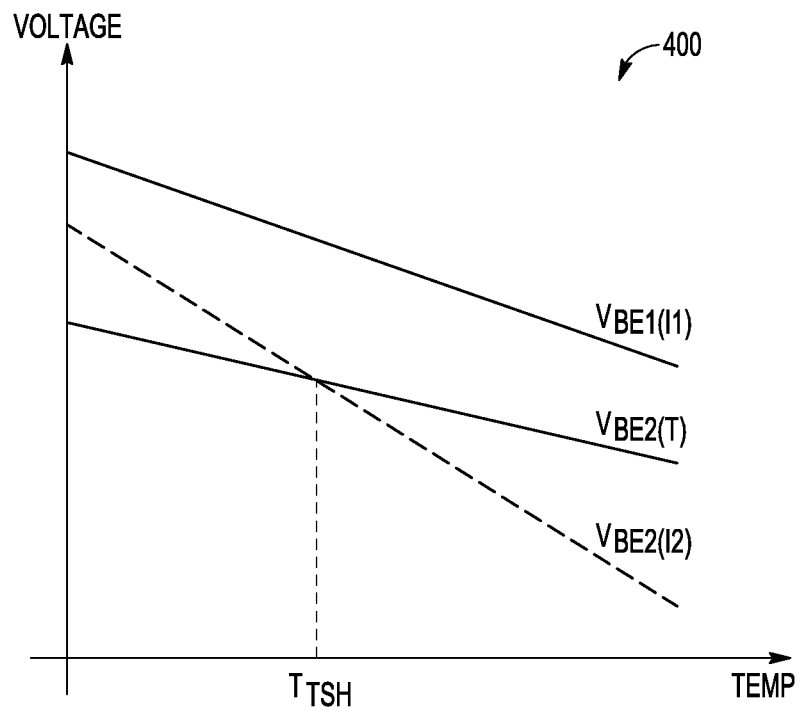
FIG. 4 illustrates a line graph depicting example base-emitter voltages of bipolar junction transistors (BJTs) in temperature detection circuitry, according to some embodiments of the present disclosure.

FIG. 4 shows the behavior of base-emitter voltages of Q1 and Q2 as base-emitter voltage curves over time in line graph 400. VBE1(I1) is illustrated as a solid line, which is VBE1 when Q1 conducts collector current equal to VBE2 (I2) is illustrated as a dashed line, which is VBE2 if Q2 were to always conduct collector current equal to I2. VBE2(T) is illustrated as a solid line, which is VBE2 as Q2 conducts current as a function of temperature T. At the threshold temperature Ttsh, VBE2(T) equals VBE2(I2). It can be seen that VBE2(T) is less than VBE2(I2) when temperature T is less than threshold temperature Ttsh, where Q2 is conducting collector current less than I2, which pulls up Q2's collector voltage and causes comparator A2 to output logic LOW. Similarly, VBE2(T) is greater than VBE2(I2) when temperature T is greater than threshold temperature Ttsh, where Q2 is conducting collector current equal to I2, which pulls down Q2's collector voltage and causes comparator A2 to output logic HIGH.

Often, when circuit error contributions are negligible (e.g., from current source mismatch, and the like), the spread in threshold temperature Ttsh will be mainly determined by process spread in Q2 global parameters that affect VBE2(I2) voltage value, which is often more significant at higher temperatures. Accuracy of the temperature detection circuitry may be improved based on local matching of resistors R1 and R2 (e.g., minimizing the process spread or deviation of R1 and R2 from their intended values) since the R2/R1 term is present in Eq. 11, which can be achieved at a small area cost. Generally, accuracy will have a weaker dependence on I1 and I2 and the local matching characteristics of Q1 and Q2 (e.g., like substantially equal emitter areas or other junction area sizes of Q1 and Q2, dopant concentration, thickness of semiconductor layers, and the like), since those values appear inside a natural logarithm in Eq. 12. It is also noted that the offsets from A1 and A2 will have negligible effect on accuracy because of the large gain between BJT base terminals and collector terminals (e.g., sensitivity to MOSFET mismatch is minimized). In this sense, the BJTs act both as the temperature sensing elements and as first-stage gain devices, which greatly relaxes A1 and A2 offset requirements, where consequently, A1 and A2 may be built using relatively small devices.

The circuitry arrangement 110, including its configuration and operation, as described above is generally applicable for the other embodiments described herein with variations. It is noted that the accuracy of the embodiment shown in FIG. 1 relies on well controlled I2 magnitude and (I1/I2) ratio, which may be generated by dedicated sources on the SoC or may be generated by self-biasing capabilities of the current-providing circuitry utilizing local matched resistors R5 and R6 to implement the well-controlled I1/I2 ratio, as further discussed below. Utilizing current sources or mirrors based on resistors R5 and R6 may allow even smaller area usage than compared with using conventional MOSFET-based current sources or mirrors. Accuracy of the temperature detection circuitry may also be calibrated by adjusting R2's resistance value (since R1 and R3 are related to cancelling out sensitivity to β), even with the presence of process spread in R2 values, as further discussed below.

Returning to FIG. 1, temperature detection circuitry 100 includes circuitry arrangement 110 shown in the bottom portion of the drawing, and current-providing circuitry shown in the top portion of the drawing, which includes current mirror 104 in the embodiment shown. Current mirror 104 is coupled to a current generator 102, which may be a dedicated current generator on an SoC that is configured to source or sink a stable and accurate current Ibias, in some embodiments. Current mirror 104 is connected to the collectors of Q1 and Q2 of circuitry arrangement 110 and is configured to generate currents I1 and I2 based on Ibias. While current mirror 104 may implement some ratio of I1 to I2, the desired known ratio N, which may be an integer or a fractional ratio, may be achieved by also adjusting a ratio of Q1 and Q2 current densities (or Jc=Ic/Ae), meaning that BJT areas of Q1 and Q2 may be adjusted (e.g., Q2 may be designed to include more unit BJT devices than Q1) to achieve the desired known ratio N. For example, even when I1 is equal to I2 (e.g., 1:1), the ratio of AE2/AE1 still remains to implement the desired ratio N.

FIG. 2 illustrates temperature detection circuitry 200 that includes circuitry arrangement 110 shown in the bottom portion of the drawing, and current-providing circuitry shown in the top portion of the drawing, which includes a pair of resistors R5 and R6. The pair of resistors R5 and R6 have resistive values that are configured to convert I1 and I2 into a voltage difference driven into the comparator A2. The desired known ratio N may be achieved by adjusting the ratio of Q1 and Q2 current densities, adjusting the ratio of I1 and I2 based on Ibias, or both. Resistors R5 and R6 are coupled between respective collectors of Q1 and Q2 and an output of the current generator 102 (e.g., R5 has a first terminal coupled to the output of generator 102 and a second terminal coupled to the collector of Q1, and R6 has a first terminal tied to R5's first terminal and the output of generator 102 and a second terminal coupled to the collector of Q2). In the embodiment shown, current generator 102 is also coupled to a positive supply voltage, such as Vdd, where some voltage Vbias1 results at the tied terminals of R5 and R6 (e.g., the "tied terminals" of R5 and R6 being the first terminals of R5 and R6 that are connected).

At the threshold temperature, Q1 conducts collector current equal to I1 and Q2 conducts collector current equal to I2, where Q1 and Q2 both have a collector voltage equal to Vbias2 (which is equivalent to Vbias as discussed above in connection with FIG. 1). According to Kirchhoff's laws, a relationship between the circuit paths through R5 and R6 is described in Equations 13 and 14:

$$R_5 I_1 = R_6 I_2 = V_{bias1} - V_{bias2} \qquad \text{Eq. 13}$$

$$I_1 + I_2 = I_{BIAS} = \frac{V_{bias1} - V_{bias2}}{R_5 + R_6} \qquad \text{Eq. 14}$$

which may be rewritten to express I1 as Equation 15 and I2 as Equation 16:

$$I_1 = \frac{V_{bias1} - V_{bias2}}{R_5} = \left(\frac{R_6}{R_5 + R_6}\right) I_{BIAS} \qquad \text{Eq. 15}$$

$$I_2 = \frac{V_{bias1} - V_{bias2}}{R_6} = \left(\frac{R_5}{R_5 + R_6}\right) I_{BIAS} \qquad \text{Eq. 16}$$

The ratio of I1 to I2 of Equations 15 and 16 may be provided as Equation 17:

$$\frac{I_1}{I_2} = \frac{R_6}{R_5} \qquad \text{Eq. 17}$$

It can be seen that when I1 is equal to N times I2 to achieve a ratio of N at the threshold temperature, resistor R6 being equal to N times R5 causes Q1 and Q2 collector voltages to match.

FIG. 3 illustrates temperature detection circuitry 300 that includes circuitry arrangement 110 in the bottom portion of the drawing, and current-providing circuitry in the top portion of the drawing. Current-providing circuitry includes a pair of resistors R5 and R6 respectively connected to the collectors of Q1 and Q2. A bias voltage Vbias1 is applied directly to the tied terminals of resistors R5 and R6, where Vbias1 may be connected to a positive supply voltage provided on the SoC, such as Vdd. Current-providing circuitry is configured to generate bias voltage Vbias2 based on Vbias1, while also setting the desired collector currents I1 and I2. An example implementation of such current-providing circuitry is shown in FIG. 5.

Figure 5:
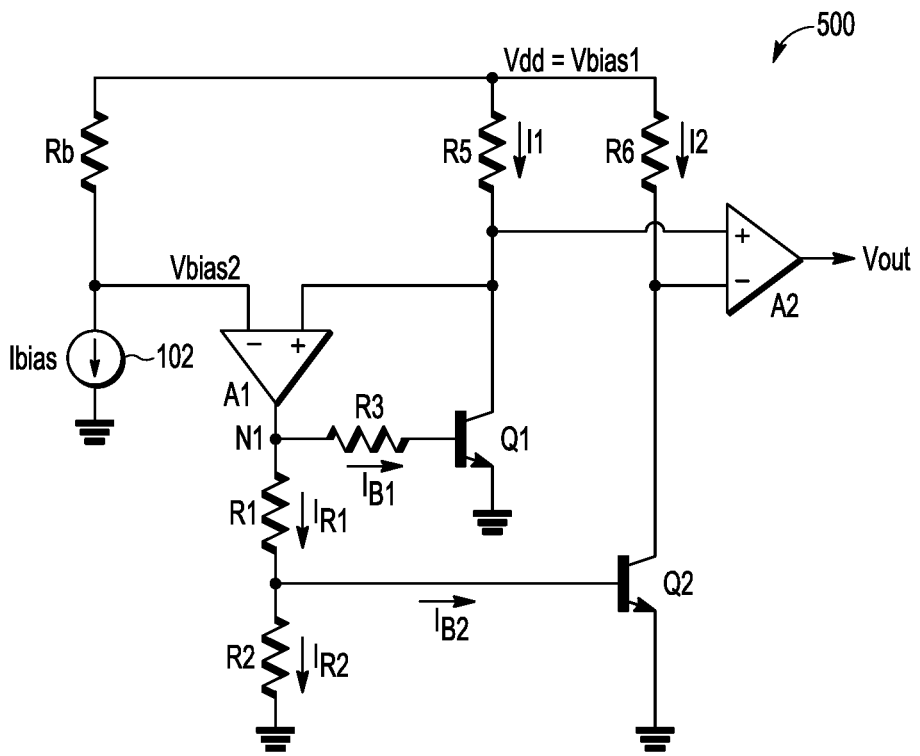
FIG. 5-9 illustrate block diagrams depicting various examples of temperature detection circuitry with self-biasing capabilities, according to some embodiments of the present disclosure.

FIG. 5 illustrates temperature detection circuitry 500 that includes circuitry arrangement 110 in the bottom portion of the drawing and current-providing circuitry in the top portion of the drawing. Current-providing circuitry includes a pair of resistors R5 and R6 respectively connected to the collectors of Q1 and Q2. The tied terminals of R5 and R6 are coupled to a positive supply voltage, such as Vdd, as Vbias1. A bias resistor Rb is also coupled between the Vbias2 input of amplifier A1 and the tied terminals of R5 and R6 (e.g., Rb has a first terminal coupled to the first terminals of R5 and R6, and a second terminal coupled to the Vbias2 input of A1). A current generator 102 is also coupled between the bias resistor Rb and ground (e.g., the second terminal of Rb is also coupled to current generator 102). In the embodiment shown, current generator 102 sinks a current Ibias through resistor Rb. The resistive value of Rb may also be configured to provide the desired Vbias2 based on Vbias1 (or Vdd) at the threshold temperature, where Vbias2 is equivalent to Vbias as discussed above in connection with FIG. 1.

The effect of comparator A2's offset in the (I1/I2) ratio is strongly attenuated by the voltage drop across the resistors R5 and R6. For example, consider A2's input offset modeled as a voltage source Voff in series with its non-inverting (+) input. Currents I1 and I2 from Equations 15 and 16 can be expressed as Equations 18 and 19:

$$I_1 = \frac{V_{bias1} - V_{bias2} + V_{off}}{R_5} \qquad \text{Eq. 18}$$

$$I_2 = \frac{V_{bias1} - V_{bias2}}{R_6} \qquad \text{Eq. 19}$$

And the ratio of I1 to I2 may be provided as Equation 20:

$$\frac{I_2}{I_1} = \frac{R_6}{R_5}\left(1 + \frac{V_{off}}{V_{bias1} - V_{bias2}}\right) \qquad \text{Eq. 20}$$

Viewing Equation 20, as long as Voff is much less than the voltage drop across the resistors R5 and R6 (which is equal to Vbias1–Vbias2), the effect of Voff on the current ratio (I1/I2) is negligible. It is also noted that a larger voltage drop across the resistors R5 and R6 translates into a larger tolerated value of Voff. The embodiments discussed herein take advantage of this feature by making a large voltage headroom available for the resistors R5 and R6, limited in one direction to VceSat and in the other direction to Vdd minus drain-source voltage VdsSat, where VdsSat represents a MOS transistor saturation voltage (e.g., when MOS transistors are used to implement a current mirror like that shown in FIG. 6 or 7), or to Vdd when Vbias1 is connected to Vdd (e.g., like that shown in FIG. 3 or 5). These practical embodiments allow relaxed requirements for A2 offset and consequently, A2 can be implemented with relatively small devices.

FIG. 6-9 provide example practical embodiments of temperature detection circuitry that has self-biasing capabilities to generate Ibias, Vbias1, and Vbias2. In other words, temperature detection circuitry itself generates its own bias signals. These examples do not require a high level of accuracy in a dedicated current or voltage signal from the SoC.

Figure 6:
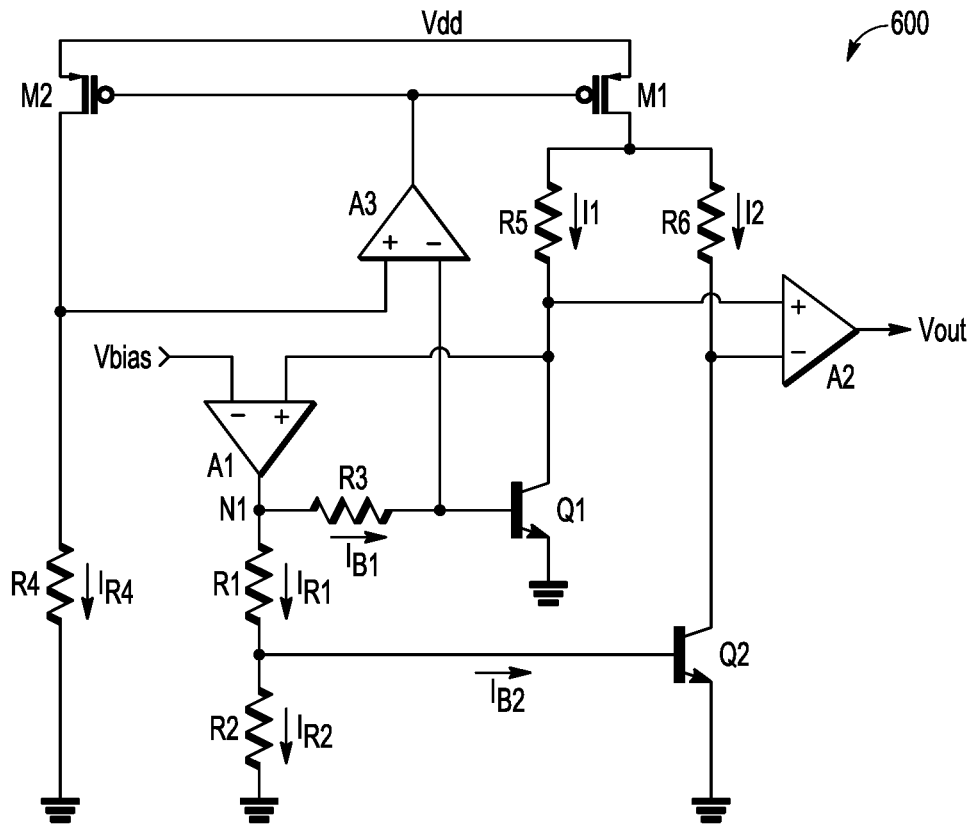

FIG. 6 illustrates temperature detection circuitry 600 that includes circuitry arrangement 110 in the bottom portion of the drawing, and current-providing circuitry in the top portion of the drawing. Current-providing circuitry includes a current mirror implemented by a pair of p-type MOSFETs M1 and M2 that also act as a current source (where a current sink may be implemented using a pair of n-type MOSFETs in other embodiments). M1 and M2 are each generally implemented by associating a number of unit devices (e.g., one or more) in parallel, where the mirroring ratio is based on the ratio of the number of unit devices that implement M1 and M2. In the embodiment shown, M1 and M2 have their gates tied (also referred to as a common gate). M1 has its drain terminal coupled to the tied terminals of R5 and R6. M2 has its drain terminal coupled to the common gate through amplifier A3, where M2's drain terminal is coupled to A3's non-inverting (+) input and A3's output is coupled to the common gate. A3's inverting (−) input is coupled to the base of Q1. The source terminals of M1 and M2 (identified by the inward pointing arrows) are coupled to a positive power supply rail, such as Vdd. M2's drain terminal is also coupled to a bias resistor R4, which in turn is coupled to a negative supply voltage rail such as ground or Vss (e.g., R4 has a first terminal coupled to both the drain terminal of M2 and the non-inverting (+) input of A3, and a second terminal coupled to ground). Due to force of feedback, amplifier A3 produces an output node voltage that is coupled to the common gate that drives the gate voltages of M1 and M2 to operate at a point where they are each conducting a current substantially equal to Ibias, which is labeled as current IR4 passing through resistor R4, which may also be referred to as a bias resistor Rbias.

Put another way, by force of feedback, A3 sets gate voltage of M2 such that VBE1 appears at top terminal of R4. Then, IR4=VBE1/R4. This current is copied by M1 with a mirroring ratio Nmir, set according to the ratio of the number of unit devices that implement M1 and M2. Then, I1+I2 is equal to the Idrain of M1, which is equal to Nmir*VBE1/R4. Part of this current (which is I1) is sunk by Q1 and the remaining part (which is I2) is sunk by Q2. At the threshold temperature, the ratio I1/I2 becomes equal to the ratio R6/R5, causing Q1 and Q2 collector voltages to match (e.g., comparator's threshold point). I1 and I2 are proportional to VBE1/R4 at the threshold temperature.

In practice, one would achieve lower Ibias spread with other current sources if those sources were "trimmed." Otherwise, Ibias generation by the self-biasing embodiments of temperature detection circuitry represents an optimum solution.

Figure 7:
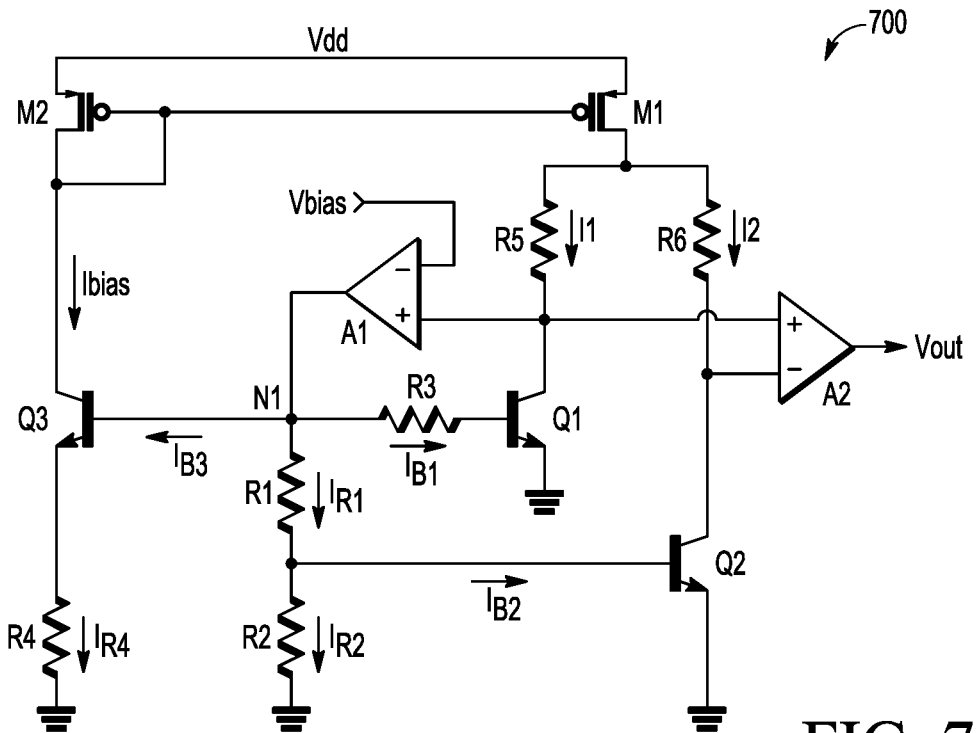

FIG. 7 illustrates temperature detection circuitry 700 that includes circuitry arrangement 110 in the bottom portion of the drawing, and current-providing circuitry in the top portion of the drawing. FIG. 7 similarly implements a current mirror using M1 and M2 that also acts as a current source, where the drain terminal of M2 is tied to the common gate of M1 and M2. M1's drain terminal is coupled to the tied terminals of R5 and R6, and M2's drain terminal is coupled to a collector of a third BJT, Q3. Q3's emitter is coupled to ground through resistor R4, and Q3's base is coupled to the junction node N1. The output node voltage of amplifier A1 also biases Q3 to act as a current source, where Q3's collector current is equal to Ibias and Q3's emitter current is equal to resistor current IR4. When receiving base-emitter voltage VBE3 that turns Q3 on, Q3 also conducts base current Ib3. Calculations similar to those above can be performed to show that Ibias (and therefore I1 and I2 at threshold temperature) is given in terms of the well-controlled ΔVBE with BJT base current components cancelled out.

Figure 8:
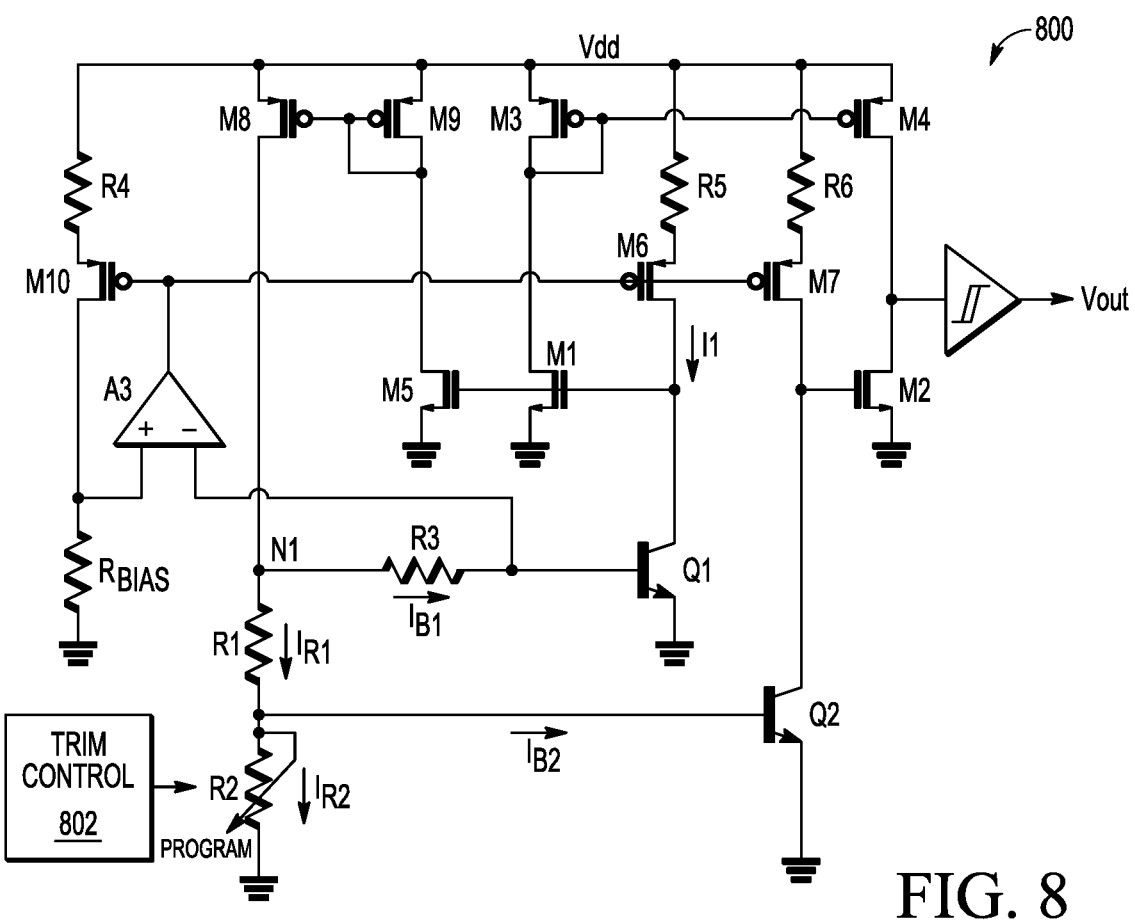
Figure 9:
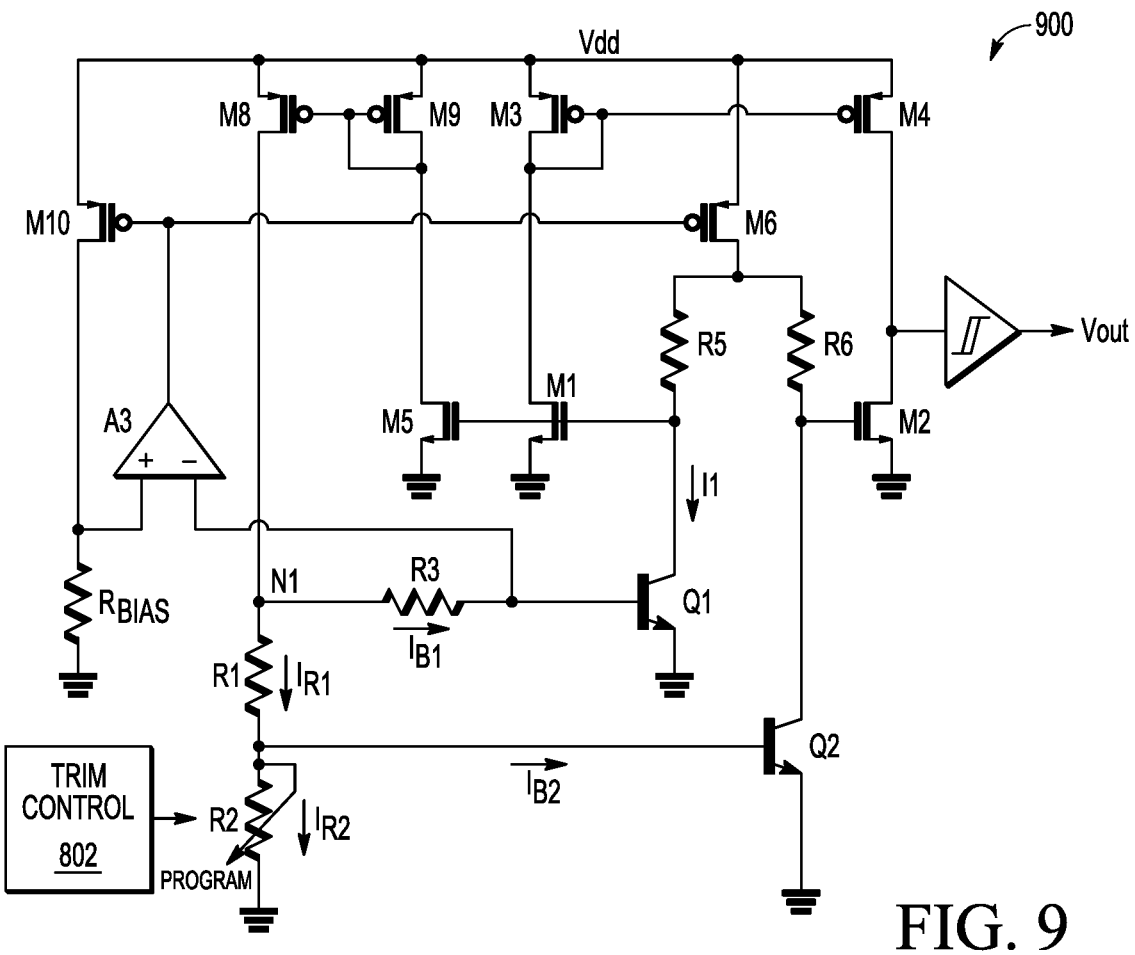

FIGS. 8 and 9 illustrate compact (e.g., area-efficient) embodiments where A1 and A2 are implemented using MOSFET gain stages. A Schmitt trigger is used in the output stage of the comparator A2. The comparator A2 is implemented by M1, M2, M3, M4, and the Schmitt trigger. Additional gain stages may be implemented in A2 before the Schmitt trigger in other embodiments. FIGS. 8 and 9 also illustrate R2 as a programmable resistor controlled by trim control 802. An example of a programmable resistor is further discussed below in connection with FIG. 10. It is noted that a programmable resistor R2 may be implemented in any of the embodiments of the present disclosure, which may be used to adjust temperature detection circuitry to monitor a desired threshold temperature, or to calibrate the temperature detection circuitry for improved accuracy, or to provide several temperature threshold options that may be sequentially set by a digital machine (such as a finite state machine implementing a binary search) to identify a narrow temperature interval that encloses the actual die temperature. Trim control 802 is further discussed below.

FIG. 8 illustrates temperature detection circuitry 800, which is similar to circuitry 600 shown in FIG. 6 except that a current mirror is used to set the ratio between I1 and I2. A current mirror is implemented by p-type MOSFETs M10, M6, and M7, having a common gate. A drain terminal of M10 is coupled to the common gate through A3, where M10's drain terminal is coupled to A3's non-inverting (+) input and A3's output is coupled to the common gate. A3's inverting (−) input is coupled to the base of Q1. The source terminals of M10, M6, and M7 are each coupled to a positive power supply rail such as Vdd through respective resistors R4, R5, and R6. M10's drain terminal is also coupled to bias resistor Rbias, which in turn is coupled to a negative power supply rail such as ground. M6's drain terminal is coupled to Q1's collector, and M7's drain terminal is coupled to Q2's collector.

Amplifier A1 is implemented by p-type MOSFETs M8 and M9, and n-type MOSFET M5. M8 and M9 implement a current mirror having a common gate, with M9's drain terminal tied to the common gate. Source terminals of M8 and M9 are coupled to Vdd. M8's drain terminal is coupled to junction node N1, and M9's drain terminal is also coupled to M5's drain terminal. M5's source terminal (identified by the outward pointing arrow) is coupled to ground, and M5's gate is tied to Q1's collector. In this arrangement, Vbias is intrinsically defined as the gate-source (VGS) voltage of M5.

Comparator A2 is implemented by n-type MOSFETs M1 and M2, p-type MOSFETs M3 and M4, and a Schmitt trigger (identified by the hysteresis symbol). M3 and M4 implement a current mirror having a common gate, with M3's drain terminal tied to the common gate. Source terminals of M3 and M4 are coupled to Vdd. M3's drain terminal is also coupled to M1's drain terminal. M4's drain terminal is also coupled to M2's drain terminal. Source terminals of M1 and M2 are coupled to ground. M1's gate is tied to Q1's collector and M2's gate is tied to Q2's collector. A Schmitt trigger has an input coupled to the drain terminals of M2 and M4, and is configured to output a digital voltage signal Vout.

It is noted that Vbias is defined by the gate-source voltage Vgs of transistor M5, which may be easily adjusted above VceSat through proper M5 sizing. Extra gain stages may be implemented before the Schmitt trigger to further minimize systematic offsets. In some embodiments that are beneficial for low power applications, it would be convenient to use low values of I2. However, such applications may increase sensitivity to β.

Trim control 802 may be implemented as a finite state machine that selects one resistive value from a plurality of possible resistive values that may be implemented by programmable resistor R2. Trim control 802 provides some M-bit amount of resolution, such as M=8 bits of resolution that provides 2^n or 256 possible selections. Each possible selection is associated with a resistive value that corresponds to a threshold temperature, where the threshold temperature monitored by the temperature detection circuitry can be increased or decreased based on increasing or decreasing the selected resistive value. A greater number of possible selections allows for finer control over the resistive value selected, allowing the threshold temperature to be fine-tuned. For example, a threshold temperature may be selected from a range of −40° C. to 150° C., which spans a total of 190 degrees. The total span may be divided into a number of steps, one step for each possible resistive value. For M=8 bits, a resolution below 1° C. per step may be achieved. Resolution may be increased by using a larger value of M.

In some embodiments, trim control 802 may also include a memory that stores a table or other data structure (e.g., a register) that indicates one or more selections for one or more initial resistive values that correspond to threshold temperatures. For example, a table may store all possible selections and their associated resistive value, where each resistive value corresponds to a threshold temperature. An initial threshold temperature can be selected and programmed, with the option to further calibrate the threshold temperature, if needed. In another example, a register may store a single selection as a pre-programmed initial resistive value for an initial threshold temperature, with the option to further calibrate the threshold temperature, if needed. In another example, the finite state machine (FSM) of trim control 802 may be implemented as part of a digital temperature sensor. The FSM may be configured to step through a number of resistive values (e.g., via a binary search, as discussed above) to determine the temperature interval that encloses the actual die temperature. The temperature interval includes two threshold temperatures, one on either side of the actual die temperature, which are separated by one step. The FSM may output an M-bit digital value corresponding to this interval, such as outputting the digital value of the resistive value that corresponds to the lower threshold temperature of the interval. Programmable resistor R2 is further discussed below in connection with FIG. 10.

FIG. 9 illustrates temperature detection circuitry 900, which is similar to circuitry shown in FIG. 6 with amplifiers A1 and A2 implemented in the same manner shown in FIG. 8. A current mirror is implemented by p-type MOSFETs M10 and M6, having a common gate. A drain terminal of M10 is coupled to the common gate through A3, where M10's drain terminal is coupled to A3's non-inverting (+) input and A3's output is coupled to the common gate. A3's inverting (−) input is coupled to the base of Q1. The source terminals of M10 and M6 are coupled to Vdd. M10's drain terminal is coupled to bias resistor Rbias, which in turn is coupled to ground. M6's drain terminal is coupled to the tied terminals of R5 and R6.

Amplifier A1 is implemented by p-type MOSFETs M8 and M9, and n-type MOSFET M5, as similarly described above in connection with FIG. 8. Comparator A2 is implemented by n-type MOSFETs M1 and M2, p-type MOSFETs M3 and M4, and a Schmitt trigger, as also similarly described above in connection with FIG. 8. Vbias2 is defined by the gate-source voltage Vgs of transistor M5, which may be easily adjusted above VceSat through proper M5 sizing. Extra gain stages may be implemented before the Schmitt trigger to further minimize systematic offsets.

Figure 10:
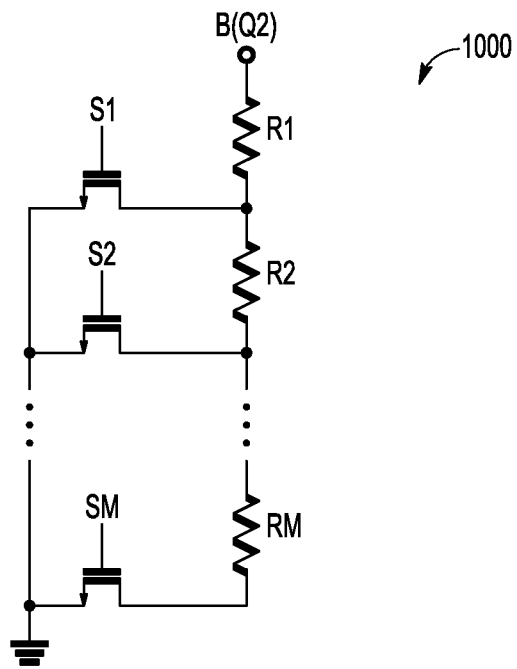
FIG. 10 illustrates a block diagram depicting an example programmable resistor that may be implemented in temperature detection circuitry, according to some embodiments of the present disclosure.

FIG. 10 shows an example programmable resistor 1000 that may be implemented in various embodiments of the temperature detection circuitry discussed herein. Programmable resistor 1000 is an array 1000 of resistors that may be utilized as R2 to trim the Q2 base bias voltage, either to program or change the desired threshold temperature, on an as needed basis (e.g., change from 0° C. to 100° C.), or to further calibrate or fine tune the threshold temperature for improved accuracy (e.g., adjust +/−0.5° C. around the threshold temperature).

In the example shown, array 1000 includes an M number of resistors R connected in series as a column from 1 to M, M being an integer of two or greater. The first resistor R1 of the column of resistors has a first terminal coupled to a node B(Q2) (shown at the top of FIG. 10) that is connected to the base of Q2. An overall resistive value of the array 1000 is a combination of the individual resistance values of one or more selected resistors R. Array 1000 is programmable over a plurality of different resistive values that are implemented by different combinations of resistance values of selected resistors within the array. Each resistor has a first terminal shown as a top terminal and a second terminal shown as a bottom terminal, where "top" and "bottom" are simply used in reference to FIG. 10. In some embodiments, each resistor R may have a same (uniform) resistance value, such as to implement uniform incremental steps through a range of possible resistive values. In other embodiments, resistors R may have different resistance values (e.g., different sized resistors), such as to perform quick tuning by using large resistors to quickly step to an estimated resistive value corresponding to a desired threshold temperature (e.g., using resistors R1, R10, R20, etc., for large stepping), with the option of performing fine tuning by using smaller resistors (interspersed between the large resistors in the column of resistors such as resistors R2-R9, R11-R19, etc.) for more precise calibration of the threshold temperature. Additional resistors or different arrangements of resistors, such as in an N row by M column arrangement, where resistors may be connected in series, in parallel, or in both series and parallel, may be implemented in array 1000 in other embodiments. For example, a binary-weighted resistor array may be implemented in other embodiments.

In the example shown, array 1000 also includes an M number of switches S, which are implemented using NMOS (or N-type metal-oxide-semiconductor) transistors, although other types of switching elements may be used in other embodiments (e.g., PMOS, or other suitable types of transistors or switching devices). Additional switches, fewer switches, or different arrangements of switches (such as for an N×M array) may be included in array 1000 in other embodiments. Each switch S has a control terminal coupled to a respective control signal output by trim control circuit 802, which either opens or closes the respective switch. Each switch S has a first current terminal connected to ground, and a second current terminal connected to the second terminal of a respective resistor R. For example, switch S1 couples the second terminal of R1 to ground, while switch SM couples the second terminal of RM to ground. In the embodiment shown, trim control circuit 802 is configured to select one or more series-connected resistors by closing the selected switch S of the last series-connected resistor to be selected. For example, to select the combination of resistors that include R1 and R2, trim control 802 closes switch S2. To select the combination of resistors that include R1 through Rx, trim control 802 closes switch Sx, up to and including the entire array (or SM). Trim control circuit 802 is also configured to open the unselected switches S by applying appropriate control signals.

Figure 11:
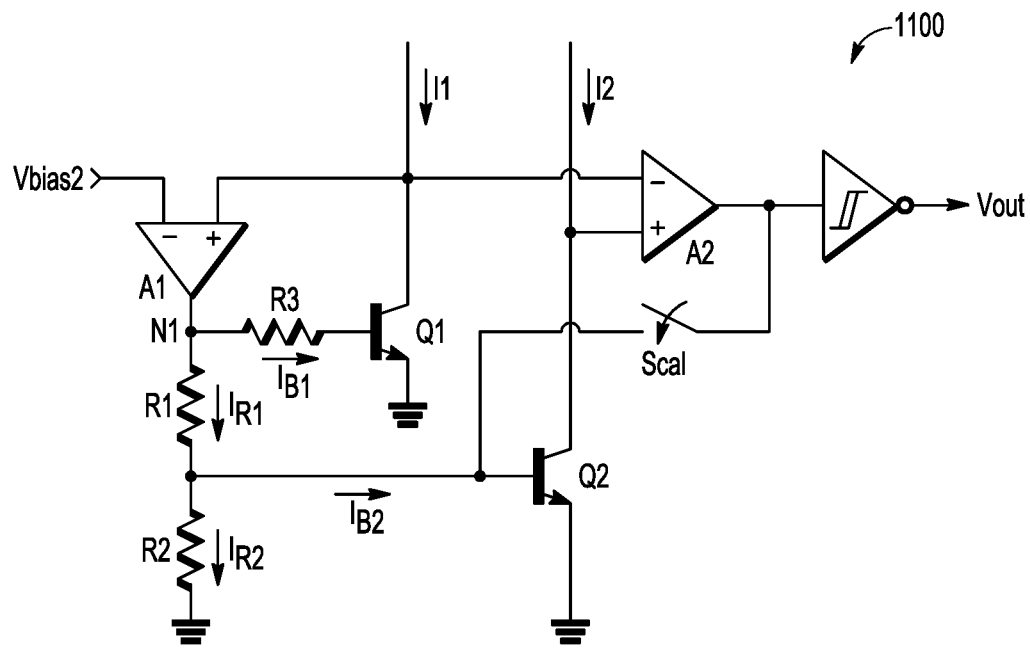
FIG. 11 illustrates a block diagram depicting an example test mode configuration of temperature detection circuitry, according to some embodiments of the present disclosure.

FIG. 11 shows an example test mode configuration of temperature detection circuitry. The circuitry shown is similar to circuitry arrangement 110 described above, with switch Scal coupling the output node of A2 to the base of Q2. Further, the input terminals of A2 are switched (as compared to A2 in FIG. 1) such that the non-inverting (+) input is connected to the collector of Q2 and the inverting (−) input is connected to the collector of Q1, which would change the polarity of the output of A2 as compared to the previously discussed scheme (e.g., output logic high when the temperature is below the threshold, and output logic low when the temperature is above the threshold). To correct the polarity, an inverted Schmitt trigger may be implemented after the output of A2, which outputs a signal similar to that discussed above (e.g., output logic high when the temperature is above the threshold, and output logic low when the temperature is below the threshold). During operational mode of temperature detection circuitry (as discussed above), switch Scal remains open.

During test mode, switch Scal is closed, forming a closed loop around Q2. Test mode may be performed while the substrate temperature is at some known test temperature (e.g., room temperature, a predetermined cold temperature, or a predetermined hot temperature). The closed loop provides feedback to A2, making it function as an amplifier like A1. Due to force of feedback, amplifier A2 produces an output node voltage that drives the base voltage of Q2 to operate at a point where Q2's collector voltage Vc (or Vce since the Q2's emitter is grounded) is equal to Vbias2. At this bias point, Q2 also conducts collector current Ic equal to current I2 (e.g., Q2 acts like a current source). During test mode, the "real world" value of VBE2 of Q2 at this bias point is measured and logged with the corresponding substrate temperature that is at a known test temperature. As noted above, trim control 802 may include a memory that stores VBE2 values (or resistive values that correspond to VBE2 values) and associated substrate temperatures. Since the real world value of VBE2 may be different for a BJT based on process spread during fabrication, measuring VBE2 provides a calibration point for the temperature detection circuitry. The VBE2 value at the test temperature may then be used to determine VBE2 at the threshold temperature Ttsh (e.g., extrapolating VBE2 using the calibrated value of the thermal coefficient), which may then be used by trim control 802 (e.g., stored in tables or memory) to program the resistor R2 to an appropriate resistive value in order for the Q2 base bias voltage to turn on Q2 at the desired threshold temperature Ttsh (e.g., for the Q2 base bias voltage to equal VBE2_Ttsh at the threshold temperature). Temperature detection circuitry can then be placed back in operational mode, with switch Scal opened.

Figures 12A, 12B:
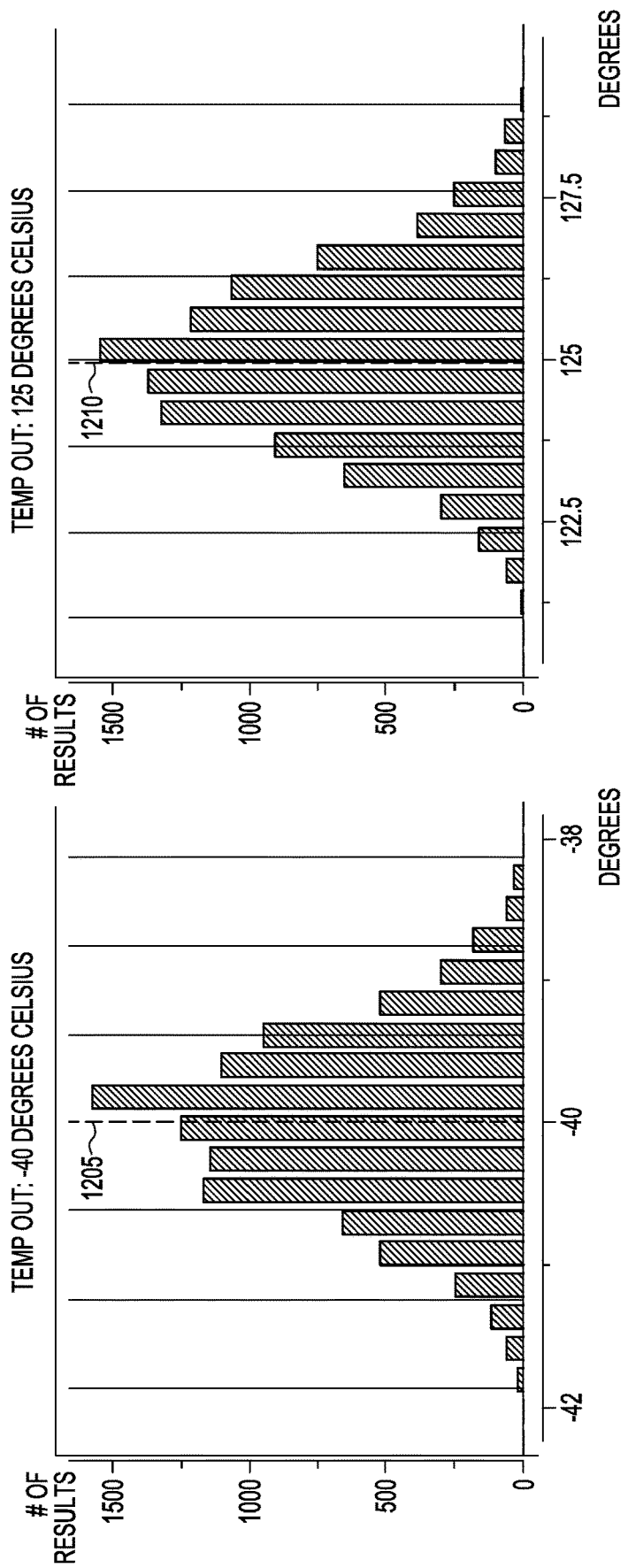
FIGS. 12A and 12B illustrate bar graphs depicting example test results for temperature spread of temperature detection circuitry, according to some embodiments of the present disclosure.

FIGS. 12A and 12B illustrate bar graphs depicting example test results for temperature spread of temperature detection circuitry. Monte Carlo simulation was performed on two circuits that implement the embodiment of temperature detection circuitry shown in FIG. 9, the first circuit configured to detect −40° C. and the second circuit configured to detect 125° C. Both circuits were designed for a target area of 0.001 mm². The difference between the circuits is device sizing and resistor arrays. The results of 10,000 simulation runs for each circuit are respectively shown in FIGS. 12A and 12B.

Without any calibration, FIG. 12A shows the first circuit detects −40° C. with +/−1.9° C. accuracy (e.g., within 3 sigma), and FIG. 12B shows the second circuit detects 125° C. with +/−4.0° C. accuracy. In both cases, sigma variation is dominated by Q2 global parameter spread. These results indicate good accuracy obtained without calibration.

By now it should be appreciated that there has been provided temperature detection circuitry that utilizes bipolar junction transistors (BJTs) in a compact circuit arrangement that accurately detects when substrate temperature crosses a threshold temperature, which is programmable based on a resistance ratio implemented in the temperature detection circuitry.

In one embodiment of the present disclosure, an integrated circuit for temperature detection is provided, which includes: a closed loop circuit branch including: a first bipolar junction transistor (BJT) having a first collector configured to receive a first current and a first emitter coupled to ground, a first resistor having one terminal coupled to a first base of the first BJT and another terminal coupled to a junction node, and an amplifier having an output coupled to the junction node and a non-inverting input coupled to the first collector of the first BJT; and an open loop circuit branch including: a second BJT having a second collector configured to receive a second current and a second emitter coupled to ground, a second resistor having one terminal coupled to a second base of the second BJT and another terminal coupled to the junction node of the closed loop circuit branch, a third resistor having one terminal coupled to the second base of the second BJT and another terminal coupled to ground, and a comparator having an inverting input coupled to the second collector of the second BJT and an output configured to provide a digital voltage signal that corresponds to a temperature reading.

One aspect of the above embodiment provides that an inverting input of the amplifier is configured to receive a bias voltage.

Another aspect of the above embodiment provides that a non-inverting input of the comparator is configured to receive a bias voltage.

Another aspect of the above embodiment provides that a non-inverting input of the comparator is coupled to the first collector of the first BJT.

Another aspect of the above embodiment provides that the third resistor includes a programmable resistor configurable to adjust a threshold temperature for detection by the comparator.

A further aspect of the above embodiment provides that the integrated circuit further includes a state machine configured to select a particular resistive value of the programmable resistor, wherein the programmable resistor includes an array of resistors coupled to an array of programmable switches, the state machine is configured to select the particular resistive value from a plurality of resistive values by activation of one or more of the programmable switches, and each of the plurality of resistive values is associated with a respective threshold temperature for detection by the comparator.

A still further aspect of the above embodiment provides that the closed loop branch, the open loop branch, and the state machine are part of a digital sensor circuit configured to output an M-bit digital output, M being an integer greater than 1, the state machine is further configured to: perform a sequence of steps that includes: implement a selected resistive value that corresponds to a given threshold temperature, check the output of the comparator to determine whether the given threshold temperature has been crossed, and select a next resistive value based on the check according to a binary search algorithm, and repeat the sequence of steps until a pair of threshold temperatures that enclose a present substrate temperature is determined.

Another aspect of the above embodiment provides that a resistance value of the first resistor is configured to be equal to a resistive value of the second resistor multiplied by a ratio of the second current to the first current.

Another aspect of the above embodiment provides that the integrated circuit further includes: current-providing circuitry including a current mirror configured to provide the first and second currents based on a bias current at a first branch of the current mirror.

A further aspect of the above embodiment provides that the integrated circuit is implemented as part of a system-on-chip (SOC), and the bias current is generated by a dedicated current generator on the SOC.

Another aspect of the above embodiment provides that the integrated circuit further includes: current-providing circuitry configured to provide the first and second currents, the current-providing circuitry including a fourth resistor having a first terminal coupled to the first collector of the first BJT and a fifth resistor having a first terminal coupled to the second collector of the second BJT, wherein second terminals of the fourth and fifth resistors are tied.

A further aspect of the above embodiment provides that the second terminals of the fourth and fifth resistors are coupled to a bias voltage.

A still further aspect of the above embodiment provides that the integrated circuit is implemented as part of a system-on-chip (SOC), and the bias voltage is a power supply voltage on the SOC.

Another further aspect of the above embodiment provides that the current-providing circuitry further includes self-biasing circuitry configured to generate a bias voltage at an inverting input of the amplifier, the self-biasing circuitry including a bias resistor having a first terminal coupled to the inverting input of the amplifier and a second terminal coupled to the second terminals of the fourth and fifth resistors.

Another further aspect of the above embodiment provides that the current-providing circuitry further includes self-biasing circuitry configured to generate a bias current through a first branch of a current mirror, the self-biasing circuitry including: a bias resistor coupled to the first branch, and a second amplifier having a non-inverting input coupled to the first branch, an output in a closed loop arrangement with the current mirror, and an inverting input coupled to the first base of the first BJT, wherein a second branch of the current mirror is coupled to the second terminals of the fourth and fifth resistors.

Another further aspect of the above embodiment provides that the current-providing circuitry further includes self-biasing circuitry configured to generate a bias current through a first branch of a current mirror, the self-biasing circuitry including: a bias resistor, and a third BJT having a third base coupled to the junction node of the closed loop circuit branch, a third collector coupled to the first branch of the current mirror, and a third emitter coupled to the bias resistor, wherein a second branch of the current mirror is coupled to the second terminals of the fourth and fifth resistors.

Another further aspect of the above embodiment provides that the amplifier is implemented with a first arrangement of MOS (metal-oxide-semiconductor) gain stages, and the comparator is implemented with a second arrangement of MOS gain stages and a Schmitt trigger.

Another aspect of the above embodiment provides that the open loop circuit branch is configurable to be placed in a test-mode configuration, wherein the test-mode configuration includes: the output of the comparator is configured to be connected to the second base of the second BJT.

In another embodiment of the present disclosure, an apparatus is provided, which includes: a combination first-stage gain and temperature sensing circuit (combination circuit) including: a first bipolar junction transistor (BJT) having a first collector configured to receive a first current and a first emitter coupled to ground; a second BJT having a second collector configured to receive a second current and a second emitter coupled to ground; a first resistor having one terminal coupled to a first base of the first BJT and another terminal coupled to a junction node; a second resistor having one terminal coupled to a second base of the second BJT and another terminal coupled to the junction node; and a third resistor having one terminal coupled to the second base of the second BJT and another terminal coupled to ground, wherein a resistance value of the first resistor is equal to a resistive value of the second resistor multiplied by a ratio of the second current to the first current.

One aspect of the above embodiment provides that the combination circuit further includes: an amplifier having an output coupled to the junction node, a non-inverting input coupled to the first collector of the first BJT, and an inverting input configured to receive a bias voltage; and a comparator having an output configured to provide a digital voltage signal that corresponds to a temperature reading, an inverting input coupled to the second collector of the second BJT, and a non-inverting input configured to receive another bias voltage.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

The circuitry of temperature detection circuitry and the circuitry being monitored by temperature detection circuitry may be formed using a sequence of numerous process steps applied to a semiconductor wafer such as a silicon wafer, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components implemented in such circuitry include but are not limited to a processor, memory, logic, analog circuitry, sensor, MEMS (microelectromechanical systems) device, standalone discrete devices such as resistors, inductors, capacitors, diodes, power transistors, and the like. In some embodiments, the active circuitry may be a combination of the integrated circuit components listed above or may be another type of microelectronic device.

In some embodiments, switches may be implemented using one or more transistors, such as n-channel or p-channel transistors, or other suitable switching devices. The switch control signals are each configured to open or close the respective switch (e.g., to close the switch by making it conductive and complete the path between the first and second terminals of the switch, or to open the switch by making the switch nonconductive and break the path between the first and second terminals of the switch).

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The description herein refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. For example, a switch may be "coupled to a plurality of nodes, but all of those nodes need not always be "connected" to each other; the switch may connect different nodes to each other depending upon the state of the switch. Furthermore, although the various schematics shown herein depict certain example arrangements of elements, additional intervening elements, devices, features, or components may be present in an actual embodiment (assuming that the functionality of the given circuit is not adversely affected).

Although the invention is described herein with reference to specific embodiments, various modifications and changes can be made without departing from the scope of the present invention as set forth in the claims below. For example, additional MOS stages may be implemented in FIG. 9. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

As used herein, the terms "substantial" and "substantially" mean sufficient to achieve the stated purpose or value in a practical manner, taking into account any minor imperfections or deviations, if any, that arise from usual and expected process abnormalities that may occur during wafer fabrication, which are not significant for the stated purpose or value. Also as used herein, the terms "approximately" and "about" mean a value close to or within an acceptable range of an indicated value, amount, or quality, which also includes the exact indicated value itself.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit for temperature detection comprising:
    a closed loop circuit branch comprising:
        a first bipolar junction transistor (BJT) having a first collector configured to receive a first current and a first emitter coupled to ground,
        a first resistor having one terminal coupled to a first base of the first BJT and another terminal coupled to a junction node, and
        an amplifier having an output coupled to the junction node and a non-inverting input coupled to the first collector of the first BJT; and
    an open loop circuit branch comprising:
        a second BJT having a second collector configured to receive a second current and a second emitter coupled to ground,
        a second resistor having one terminal coupled to a second base of the second BJT and another terminal coupled to the junction node of the closed loop circuit branch,
        a third resistor having one terminal coupled to the second base of the second BJT and another terminal coupled to ground, and
        a comparator having an inverting input coupled to the second collector of the second BJT and an output configured to provide a digital voltage signal that corresponds to a temperature reading.

2. The integrated circuit of claim 1, wherein an inverting input of the amplifier is configured to receive a bias voltage.

3. The integrated circuit of claim 1, wherein a non-inverting input of the comparator is configured to receive a bias voltage.

4. The integrated circuit of claim 1, wherein a non-inverting input of the comparator is coupled to the first collector of the first BJT.

5. The integrated circuit of claim 1, wherein a resistance value of the first resistor is configured to be equal to a resistive value of the second resistor multiplied by a ratio of the second current to the first current.

6. The integrated circuit of claim 1, wherein the open loop circuit branch is configurable to be placed in a test-mode configuration, wherein the test-mode configuration comprises:
    the output of the comparator being configured to be connected to the second base of the second BJT.

7. The integrated circuit of claim 1, further comprising:
    current-providing circuitry comprising a current mirror configured to provide the first and second currents based on a bias current at a first branch of the current mirror.

8. The integrated circuit of claim 7, wherein
    the integrated circuit is implemented as part of a system-on-chip (SOC), and
    the bias current is generated by a dedicated current generator on the SOC.

9. The integrated circuit of claim 1, wherein
the third resistor comprises a programmable resistor configurable to adjust a threshold temperature for detection by the comparator.

10. The integrated circuit of claim 9, further comprising a state machine configured to select a particular resistive value of the programmable resistor, wherein
the programmable resistor comprises an array of resistors coupled to an array of programmable switches,
the state machine is configured to select the particular resistive value from a plurality of resistive values by activation of one or more of the programmable switches, and
each of the plurality of resistive values is associated with a respective threshold temperature for detection by the comparator.

11. The integrated circuit of claim 10, wherein
the closed loop branch, the open loop branch, and the state machine are part of a digital sensor circuit configured to output an M-bit digital output, M being an integer greater than 1, and
the state machine is further configured to:
perform a sequence of steps that comprises:
implement a selected resistive value that corresponds to a given threshold temperature,
check the output of the comparator to determine whether the given threshold temperature has been crossed, and
select a next resistive value based on the check according to a binary search algorithm, and
repeat the sequence of steps until a pair of threshold temperatures that enclose a present substrate temperature is determined.

12. The integrated circuit of claim 1, further comprising:
current-providing circuitry configured to provide the first and second currents, the current-providing circuitry comprising a fourth resistor having a first terminal coupled to the first collector of the first BJT and a fifth resistor having a first terminal coupled to the second collector of the second BJT, wherein second terminals of the fourth and fifth resistors are tied.

13. The integrated circuit of claim 12, wherein
the current-providing circuitry further comprises self-biasing circuitry configured to generate a bias voltage at an inverting input of the amplifier, the self-biasing circuitry comprising a bias resistor having a first terminal coupled to the inverting input of the amplifier and a second terminal coupled to the second terminals of the fourth and fifth resistors.

14. The integrated circuit of claim 12, wherein
the current-providing circuitry further comprises self-biasing circuitry configured to generate a bias current through a first branch of a current mirror, the self-biasing circuitry comprising:
a bias resistor coupled to the first branch, and
a second amplifier having a non-inverting input coupled to the first branch, an output in a closed loop arrangement with the current mirror, and an inverting input coupled to the first base of the first BJT, wherein a second branch of the current mirror is coupled to the second terminals of the fourth and fifth resistors.

15. The integrated circuit of claim 12, wherein
the current-providing circuitry further comprises self-biasing circuitry configured to generate a bias current through a first branch of a current mirror, the self-biasing circuitry comprising:
a bias resistor, and
a third BJT having a third base coupled to the junction node of the closed loop circuit branch, a third collector coupled to the first branch of the current mirror, and a third emitter coupled to the bias resistor, wherein a second branch of the current mirror is coupled to the second terminals of the fourth and fifth resistors.

16. The integrated circuit of claim 12, wherein
the amplifier is implemented with a first arrangement of MOS (metal-oxide-semiconductor) gain stages, and
the comparator is implemented with a second arrangement of MOS gain stages and a Schmitt trigger.

17. The integrated circuit of claim 12, wherein
the second terminals of the fourth and fifth resistors are coupled to a bias voltage.

18. The integrated circuit of claim 17, wherein
the integrated circuit is implemented as part of a system-on-chip (SOC), and
the bias voltage is a power supply voltage on the SOC.

19. An apparatus comprising:
a combination first-stage gain and temperature sensing circuit comprising:
a first bipolar junction transistor (BJT) having a first collector configured to receive a first current and a first emitter coupled to ground;
a second BJT having a second collector configured to receive a second current and a second emitter coupled to ground;
a first resistor having one terminal coupled to a first base of the first BJT and another terminal coupled to a junction node;
a second resistor having one terminal coupled to a second base of the second BJT and another terminal coupled to the junction node; and
a third resistor having one terminal coupled to the second base of the second BJT and another terminal coupled to ground, wherein
a resistance value of the first resistor is equal to a resistive value of the second resistor multiplied by a ratio of the second current to the first current.

20. The apparatus of claim 19, wherein the combination first-stage gain and temperature sensing circuit further comprises:
an amplifier having an output coupled to the junction node, a non-inverting input coupled to the first collector of the first BJT, and an inverting input configured to receive a bias voltage; and
a comparator having an output configured to provide a digital voltage signal that corresponds to a temperature reading, an inverting input coupled to the second collector of the second BJT, and a non-inverting input configured to receive another bias voltage.

* * * * *